US006069676A

United States Patent [19]

Yuyama

[11] Patent Number: 6,069,676

[45] Date of Patent: May 30, 2000

[54] SEQUENTIAL COLOR DISPLAY DEVICE

[75] Inventor: Harumi Yuyama, Yamanashi-ken, Japan

[73] Assignee: Citizen Electronics Co., Ltd., Fujiyoshida, Japan

[21] Appl. No.: 08/835,515

[22] Filed: Apr. 8, 1997

[30] Foreign Application Priority Data

Aug. 2, 1996 [JP] Japan .................................... 8-219140

[51] Int. Cl.[7] ........................... G02F 1/136; G02F 1/1335

[52] U.S. Cl. .............................. 349/62; 349/50; 359/142; 340/825.22; 235/380; 368/10

[58] Field of Search ......................... 349/62, 50; 359/142

[56] References Cited

U.S. PATENT DOCUMENTS 4,816,855 3/1989 Kitaura et al. .......................... 354/415
5,138,590 8/1992 Masuda et al. ........................... 368/10
5,578,999 11/1996 Matsuzawa et al. .................... 340/825
5,606,158 2/1997 Takemoto et al. ...................... 235/380

*Primary Examiner*—William L. Sikes
*Assistant Examiner*—Julie Ngo
*Attorney, Agent, or Firm*—Dennison, Meserole, Scheiner & Schultz

[57] ABSTRACT

Red, green and blue light sources, and a shutter are provided. Photosensors are provided for detecting the luminance of each of the light sources. A controller is provided for sequentially operating each of the light sources, the shutter, and the photosensor in synchronism with each other at regular intervals. A luminance control circuit is provided for comparing a luminance detected by the photosensor with a reference value and for controlling the luminance of each of the light sources based on the comparison so as to keep a color balance of the light emitted from the color display device.

12 Claims, 13 Drawing Sheets

SEQUENTIAL COLOR DISPLAY DEVICE

BACKGROUND OF THE INVENTION

The present invention relates to an improvement of a sequential color display device in which a plurality of light emitting elements, each emitting light of color different from other elements, are sequentially operated in a constant order to emit light at regular intervals over the resolution of human eyes. The rays of emitted light are mixed due to the time axis synthesis function of human eyes, for producing a multi-color display.

Heretofore, a sequential multi-color display device is known. For example, Japanese Patent Application Publication 63-41078 discloses a sequential multi-color display device comprising a plurality of light sources, each emitting light of an either color of red, green or blue, shutter means for passing the light emitted from each light source in accordance with display information. The light sources are sequentially operated at constant time intervals, for example, 1/90 seconds in TV, within one field of 1/30 seconds, and the shutter means is controlled in synchronism with the operation of the light sources.

As a color light source, fluorescent lamp, EL (electroluminescent) panel, LED (Light Emitting Diode) may be available. A blue color LED has been developed in recent years. Therefore, a sequential multi-color display device using red, green and blue color LEDs is becoming capable of realization.

FIG. 14 is a perspective view showing a sequential color display device using color LEDs which the applicant knows. The display device has a light source unit 1 comprising an LED box 3 in which three color LEDs, that is, red color LED 2*a*, green color LED 2*b* and blue color LED 2*c* are provided as light sources, a light diffusion plate 4, and an LED driving circuit 5. In front of the light diffusion plate 4, a liquid crystal shutter 6 is provided. The liquid crystal shutter 6 comprises a single cell of a transmission type. When the cell is driven, it becomes transparent so as to pass emitted light. The operation of the liquid crystal shutter 6 is controlled by a shutter controlling circuit 8. Both the LED driving circuit 5 and the shutter controlling circuit 8 are operatively connected to a control circuit 9 having a synchronizing circuit. The operation of the liquid crystal shutter 6 is controlled in synchronism with the lighting of each of the LEDs 2*a*, 2*b* and 2*c*.

FIG. 15 is a block diagram showing flows of signals of the sequential color display device shown in FIG. 14. The light source has three primary color light source LEDs, that is red, green and blue color light source LEDs 2*a*, 2*b* and 2*c*. The light source LEDs are driven respectively by red, green and blue lighting signals, LR, LG and LB fed from the LED driving circuit 5. The liquid crystal shutter 6 is controlled by a data signal D applied from the shutter controlling circuit 8. The LED driving circuit 5 and the shutter controlling circuit 8 are synchronously operated in accordance with the control signal from the control circuit 9.

The above mentioned sequential color display device has a simple structure. However, the luminance of the LED decreases with time. FIG. 16 shows the reduction of the luminance which is caused by heating of LED, and FIG. 17 shows the reduction with time.

Therefore, in order to keep a constant luminance of the LED, the current flowing through the LEDs must be increased. As a result, the LEDs are considerably heated, causing unevenness in luminances of the LEDs. The variation of luminances of the LEDs from initial set values causes breaking of a color balance in particular the white balance.

SUMMARY OF THE INVENTION

An object of the present invention is to provide a sequential color display device in which the luminance of each of the color light sources is checked so that the luminance of each color light source may be kept at a desired value, and the white balance may be kept.

According to the present invention, there is provided a sequential color display device comprising a plurality of light sources, each emitting different color light from other light sources, a shutter for sequentially passing color light beams from the light sources, at least one photosensor for detecting luminance of each of the light sources, a controller for sequentially operating each of the light sources, the shutter, and the photosensor in synchronism with each other at regular intervals, and luminance control means responsive to a luminance detected by the photosensor for controlling the luminance of each of the light sources so as to keep a color balance of the light emitted from the color display device.

The color balance is in particular the white balance.

The light source is a light emitting diode, the shutter is a liquid crystal shutter, and the photosensor is a photodiode.

The controller is provided for sequentially producing operating signals for applying the output of the photosensor to the luminance control means.

The luminance control means comprises a subtracter for comparing an input signal dependent on the detected luminance with a reference value and producing an output signal based on the comparison.

The luminance control means has a driving circuit responsive to the output signal of the subtracter for controlling a current passing each of the light sources so as to keep the color balance.

The luminance control means has an integrating circuit for integrating an input signal dependent on the output of the photosensor, and a Zener diode for applying the output of the integrating circuit to the subtracter when exceeding the breakdown voltage thereof.

These and other objects and features of the present invention will become more apparent from the following detailed description with reference to the accompanying drawings.

DETAILED DESCRIPTION OF PREFERRED EMBODIMENTS

Embodiments of the sequential color display device according to the present invention will be described in detail with reference to the drawings.

Figure 1:
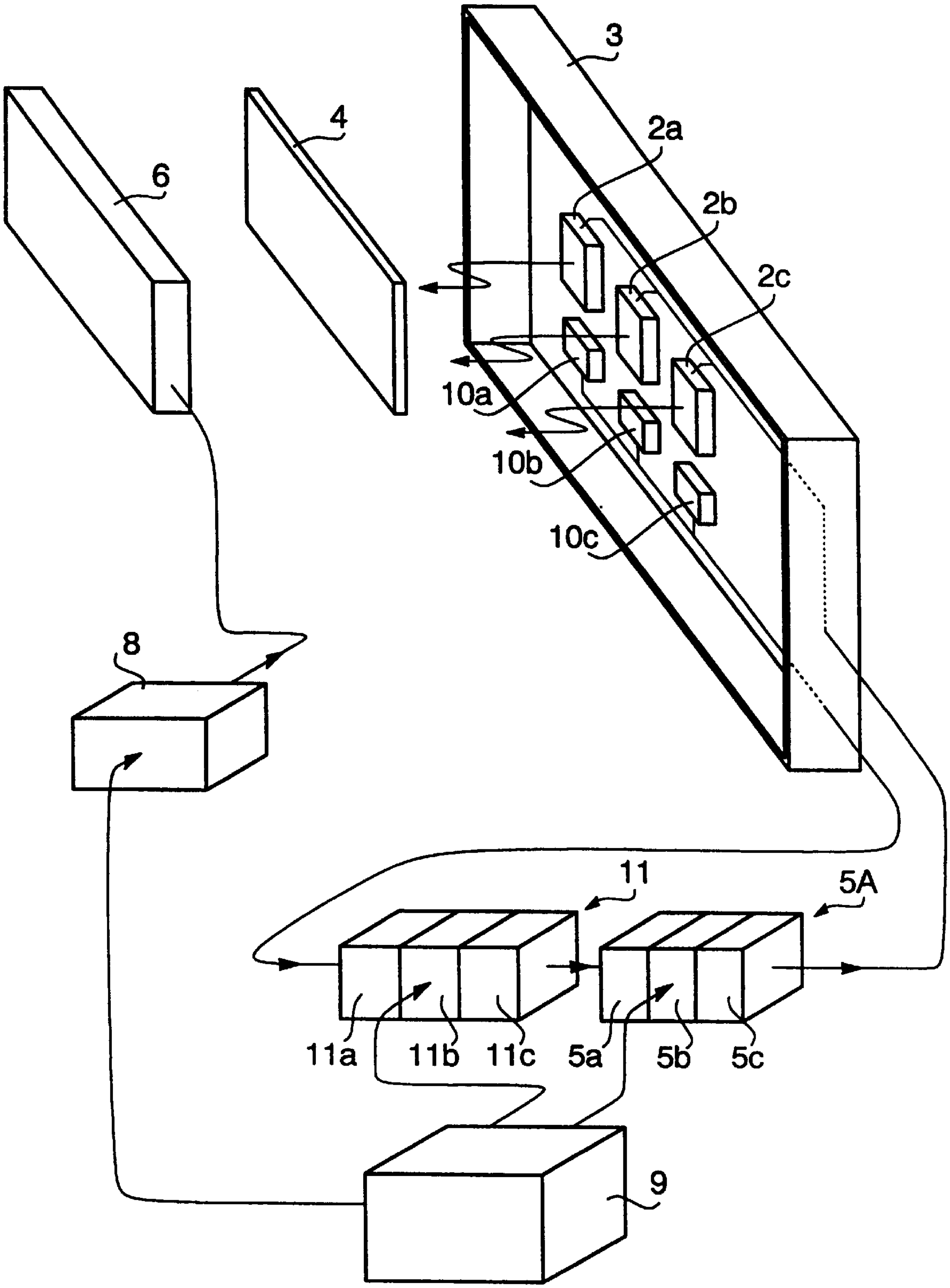
FIG. 1 a perspective view showing a sequential color display device according to the present invention.
Figure 15:
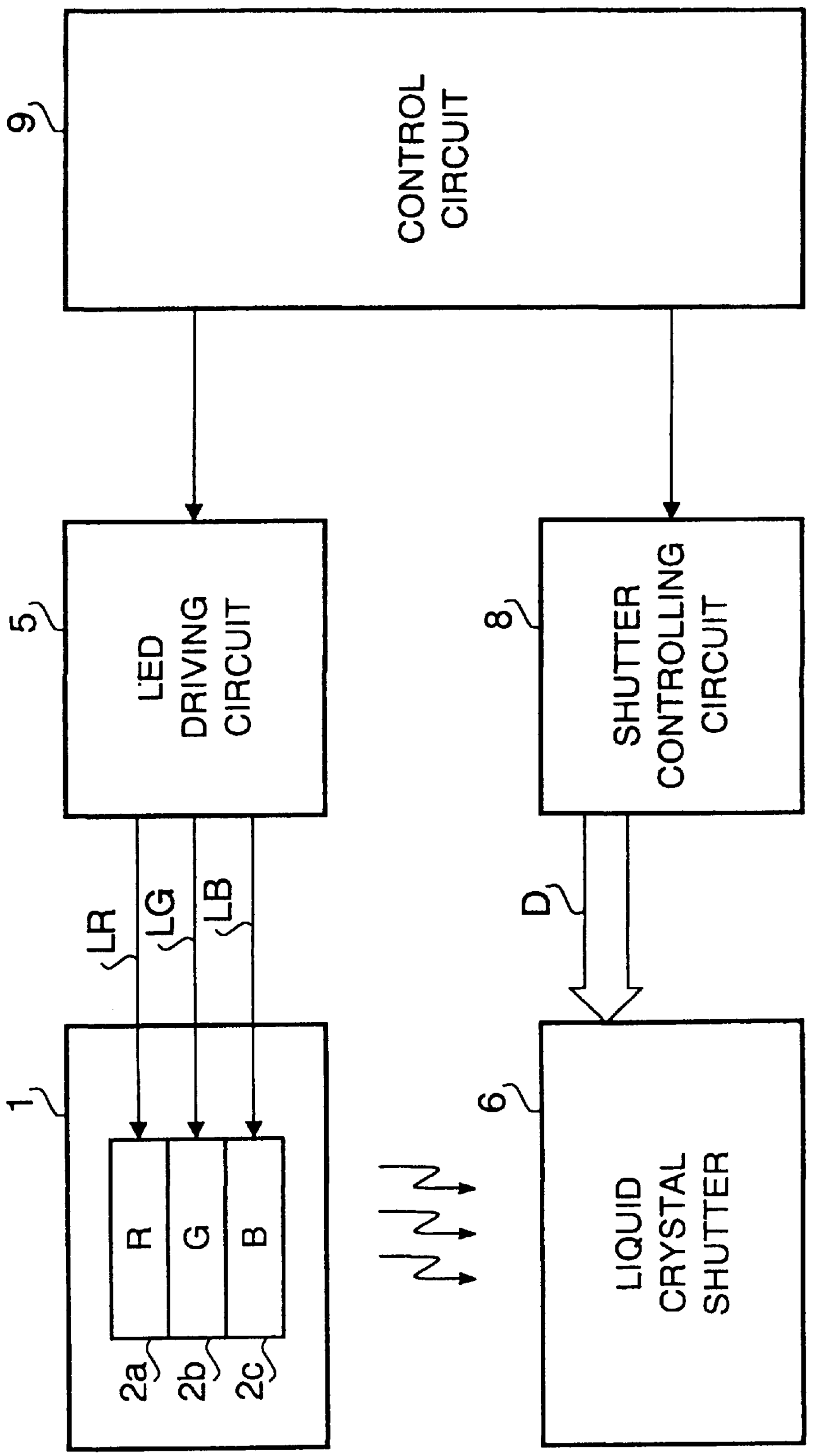
FIG. 15 PRIOR ART
FIG. 15 is a block diagram showing a flow of signals of the sequential color display device shown in FIG. 14.

FIG. 1 is a perspective view showing a sequential color display device of the present invention. Since the light diffusion plate 4, liquid crystal shutter 6, and shutter controlling circuit 8 are the same as FIG. 15, these are not explained. In FIG. 1, there are provided three color light sources, that is, red, green and blue color LEDs 2*a*, 2*b* and 2*c* are arranged in a lateral direction in the LED box 3, and photosensors 10*a*, 10*b* and 10*c* are disposed adjacent the LEDs. Each of the photosensors 10*a*, 10*b* and 10*c* is a photoelectric converting element such as a photodiode, phototransistor, solar cell. Each of the photosensor detects the luminance of the corresponding LED, and produces a signal the voltage of which depends on the detected luminance. The signal is sent to a light quantity controlling unit 11. The light quantity controlling unit 11 comprises three control circuits 11*a*, 11*b* and 11*c*. Each control circuit compares the level of the input signal with a reference voltage. The reference voltage is set so as to keep the white balance. The light quantity controlling unit 11 sends a light quantity controlling voltage signal based on the comparison to an LED driving circuit SA. The LED driving circuit SA comprises three driving circuits 5*a*, 5*b* and 5*c*. Each of the LED driving circuits converts the light quantity controlling voltage signal supplied from the light quantity controlling unit 11 to a current corresponding to the voltage signal, and supplies it to the corresponding LED.

When the detected value at one of the photosensors 10*a*, 10*b* and 10*c* is lower than the reference voltage, the quantity of light is increased by increasing the current flowing through the corresponding LED, thereby preventing the drop of the luminance. To the contrary, when the detected value at one of the photosensors 10*a*, 10*b* and 10*c* is higher than the reference voltage, the quantity of light is decreased by decreasing the current flowing through the corresponding LED.

Figure 2:
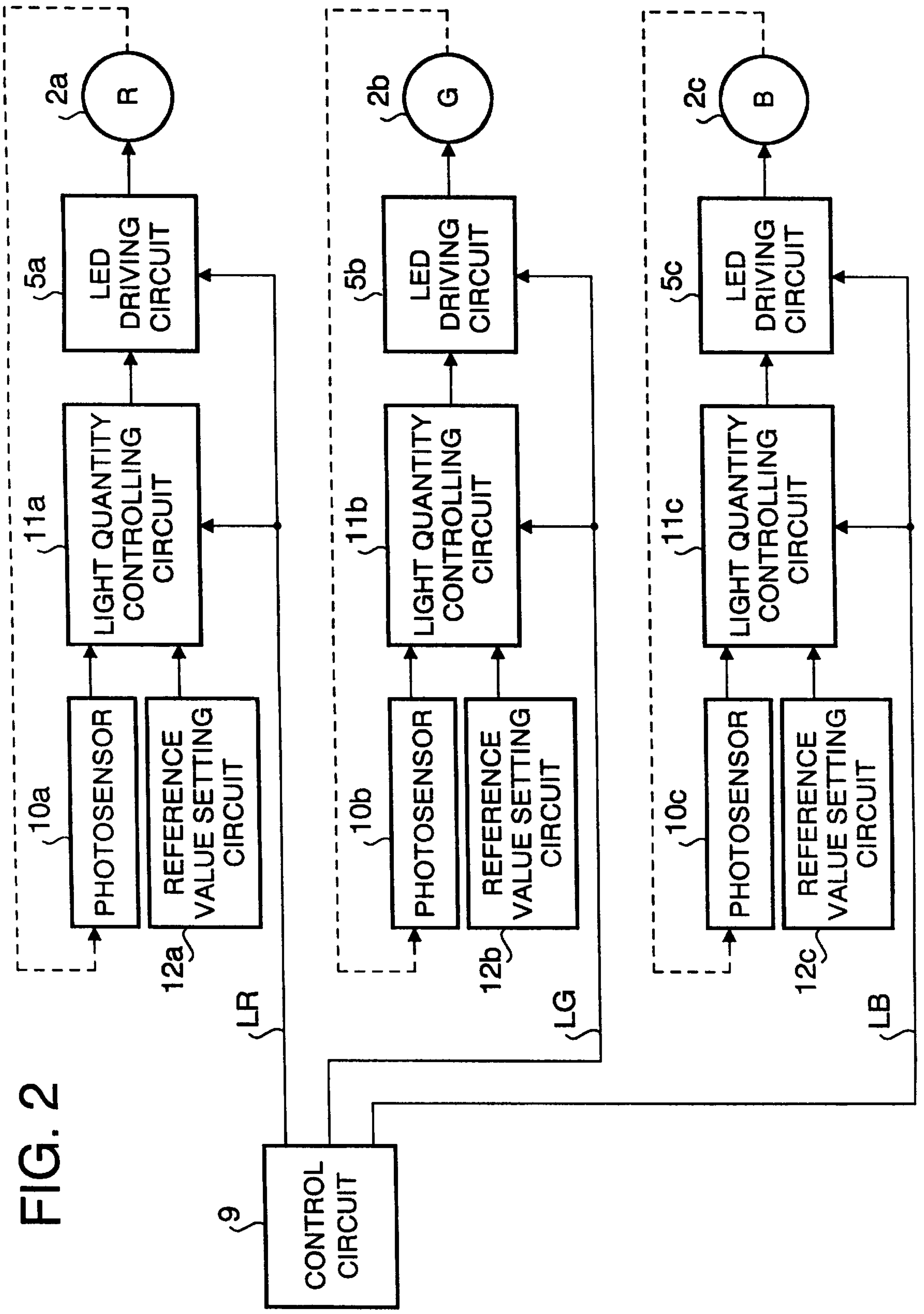
FIG. 2 is a block diagram showing flows of signals of the sequential color display device.

Referring to FIG. 2, the photosensors 10*a*, 10*b* and 10*c* are disposed adjacent the red, green and blue LEDs 2*a*, 2*b* and 2*c*. The reference value of the luminance for each of the LEDs 2*a*, 2*b* and 2*c* is independently set by each of reference value setting circuits 12*a*, 12*b* and 12*c*. Each of the light quantity controlling circuits 11*a*, 11*b* and 11*c* compares each of the detected value from each of the photosensors 10*a*, 10*b* and 10*c* with each reference value of the luminance for each of the LEDs 2*a*, 2*b* and 2*c* to produce an LED control voltage. The LED control voltage is applied to each of the LED driving circuits 5*a*, 5*b* and 5*c*. The driving circuits 5*a*, 5*b* and 5*c* convert LED control voltages to LED driving currents. Each LED driving current is applied to each of the LEDs 2*a*, 2*b* and 2*c*, thereby changing quantity of color light emitted from each LED. The color light emitted from each LED is received by the photosensor and fed back to each of the light quantity controlling circuits 11*a*, 11*b* and 11*c* to maintain the white balance.

Figure 3A:
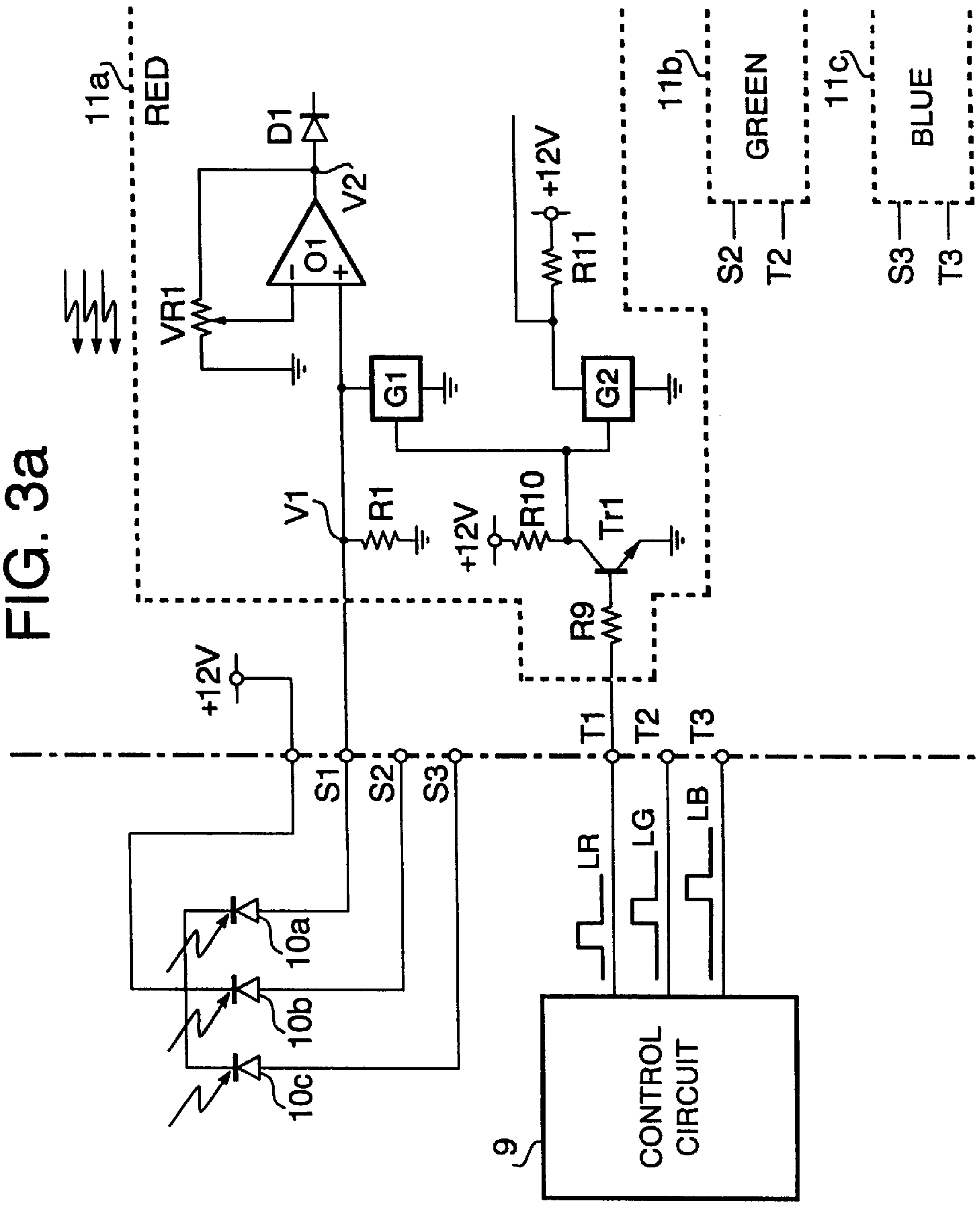
FIGS. 3*a* and 3*b* are diagrams showing a light quantity controlling circuit and an LED driving circuit of the present invention.
Figure 3B:
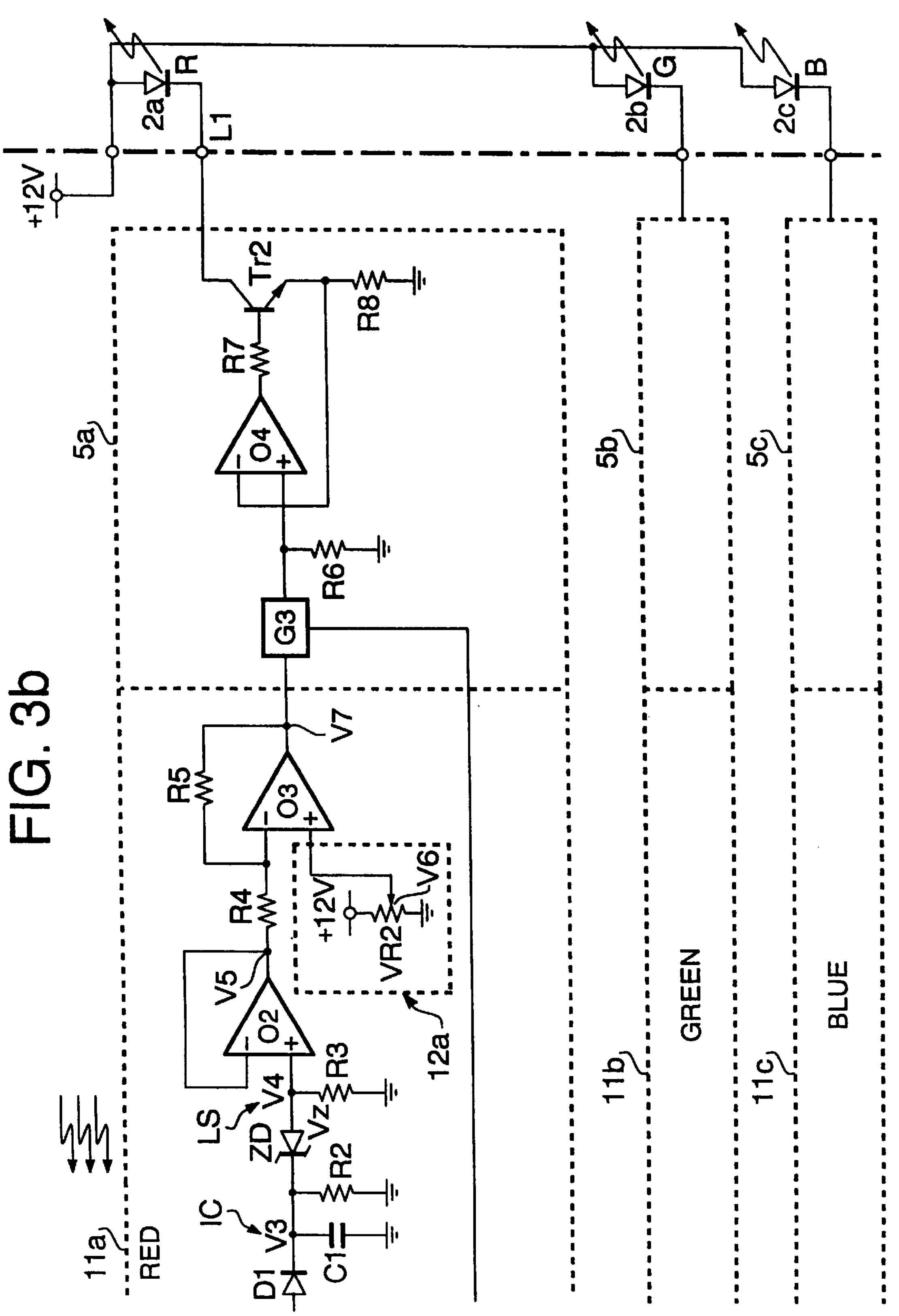

FIGS. 3*a* and 3*b* show a concrete circuit diagram of the light quantity controlling circuit and the LED driving circuit of the first embodiment of the present invention shown in FIGS. 1 and 2. In the figure, only the light quantity controlling circuit 11*a* and the LED driving circuit 5*a* for red are illustrated, circuits for green and blue are omitted since these circuits are the same as the red circuit.

The photosensors 10*a*, 10*b* and 10*c* are connected to light quantity controlling circuits 11*a*, 11*b* and 11*c* at terminals S1, S2 and S3, and the control circuit 9 is connected to the circuits 11*a* to 11*c* at terminals T1, T2 and T3. The control circuit 9 produces operating signals LR, LG and LB in sequence at regular intervals. The interval is set to a period in which the three colors are mixed because of the after-image effect.

The terminal S1 is connected to a noninverting input of an operational amplifier (hereinafter called op-amp) O1. The terminal T1 is connected to a base of a transistor Tr1 through a resistor R9. The collector of the transistor Tr1 is connected to a source of 12 volt through a resistor R10 and to control inputs of analogue gates G1 and G2. The output of the op-amp O1 is connected to an inverting input thereof through a variable resistor VR1 and to a level shift circuit LS comprising a Zener diode ZD and a resistor R3, through a diode D1 and an integrating circuit IC comprising a capacitor C1 and a resistor R2. The level shift circuit is connected to noninverting input of an op-amp 02 as a buffer amplifier. The output of the op-amp O2 is connected to an inverting input of a subtracter O3 through a resistor R4. The subtracter O3 is provided to have a gain 1 by resistors R4 and R5. The noninverting input of the subtracter O3 is connected to the reference value setting circuit 12*a* comprising a variable resistor VR2. The reference voltage V6 is set to such a value that the LED 2*a* emits light of a maximum luminance when the input voltage V5 is zero. The breakdown voltage VZ of the Zener diode ZD is set to a value so that the output voltage V7 of the subtracter causes the LED 2*a* to emit the red light at a luminance so as to keep the white balance.

The output of the subtracter O3 is connected to a noninverting input of an op-amp O4 through an analogue gate G3. The output of the op-amp O4 is connected to a base of a transistor Tr2. The collector of the transistor Tr2 is connected to the LED 2*a* and the emitter is connected to the ground through a resistor R8 and to the inverting input of the op-amp O4. The control input of the analogue gate G3 is connected to the source of 12 volt through a resistor R11.

When a red light signal LR is not applied to the terminal T1, the transistor Tr1 is nonconductive. Therefore, the control inputs of the analogue gates G1 and G2 are applied with the voltage of 12 volt to be opened, and the gate G3 is closed. Thus, the transistor Tr2 is nonconductive, so that the LED 2*a* is inoperative.

When the red light signal LR is applied to the terminal T1, the transistor Tr1 becomes conductive. Therefore, the gates G1 and G2 are closed, and the gate G3 is opened. Immediately after the application of the red light signal LR, the output voltage of the op-amp O1, and hence the output voltage of the integrating circuit IC is lower than the breakdown voltage of the Zener diode ZD. Therefore, the input voltage V5 is zero, so that the subtracter O3 produces an output having a maximum voltage V7 dependent on the reference voltage V6. The maximum voltage V7 is applied to the base of the transistor Tr2 through the op-amp O4. Thus, a maximum current dependent on the maximum voltage V7 and the resistance of the resistor R8 flows in the transistor Tr2. Accordingly, the LED 2*a* emits the red light of the maximum luminance. The emitted red light is received by the photosensors 10*a*, 10*b* and 10*c*. However, only the output of the photosensor 10*a* is applied to the op-amp 01, since only the gate G1 is closed. The output voltage V2 dependent on the voltage V1 and the resistance of the resistor VR1 is applied to the integrating circuit IC and integrated therein. When the integrated voltage V3 exceeds the breakdown voltage VZ of the Zener diode ZD, the current passes the level shift circuit LS and flows in op-amp O2 at a voltage V4 dependent on the breakdown voltage VZ. The output of the op-amp O2 is applied to the subtracter O3. The output voltage V7 of the subtracter reduces by the input voltage V5. As a result, the luminance of the LED 2*a* reduces to a proper value to keep the white balance.

When the luminance of the LED 2*a* decreases, and the voltage V3 becomes lower than the breakdown voltage VZ of the Zener diode ZD, the input voltage V5 of the subtracter O3 becomes zero. Thus, the subtracter O3 produces the maximum output, so that the LED produces the light of the maximum luminance. Thereafter, the above described operations are repeated. The other circuits of green and blue have the same operation as the red circuit. Thus, the white balance of the display device can be kept.

Figure 4:
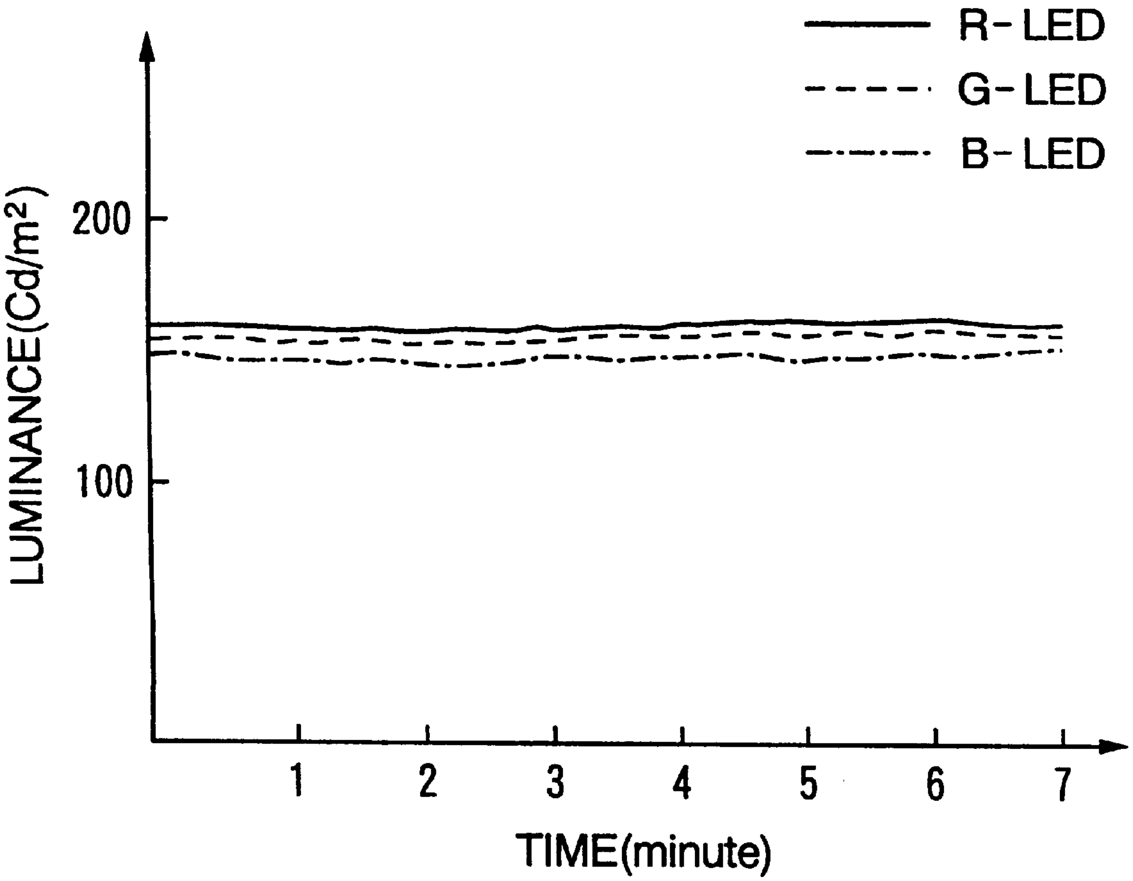
FIG. 4 is a graph showing the luminance of each LED.
Figure 16:
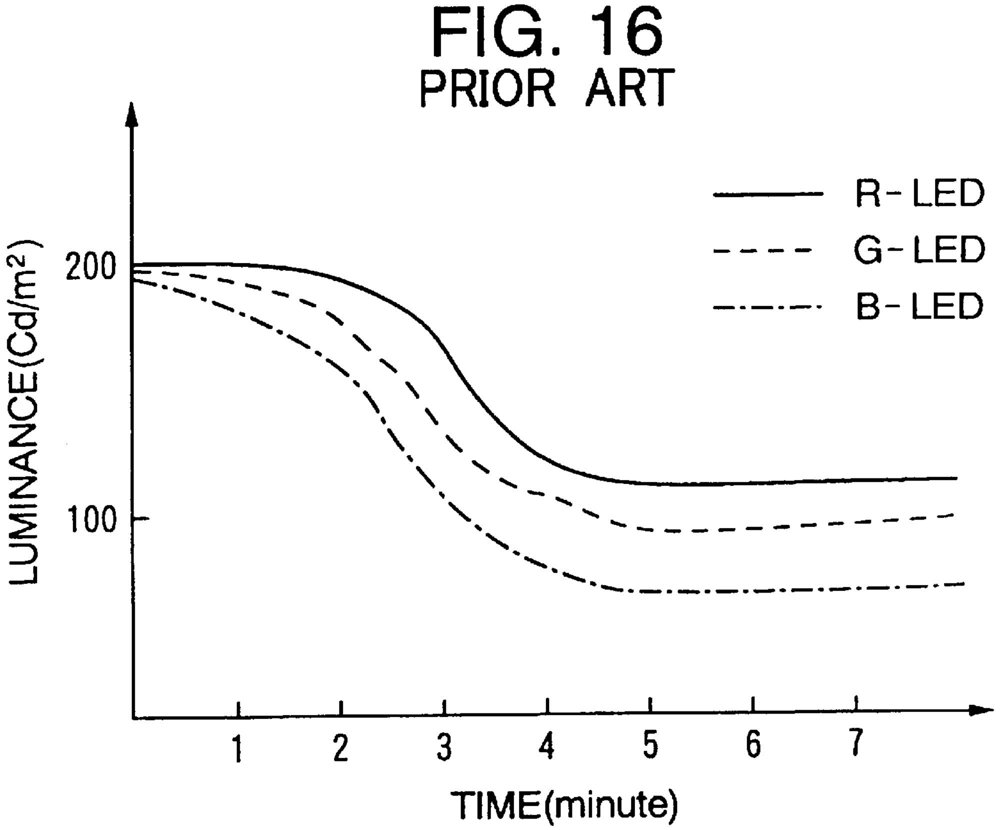
FIG. 16 PRIOR ART
FIG. 16 is a graph showing the variation of the luminance caused heating of each LED.
Figure 17:
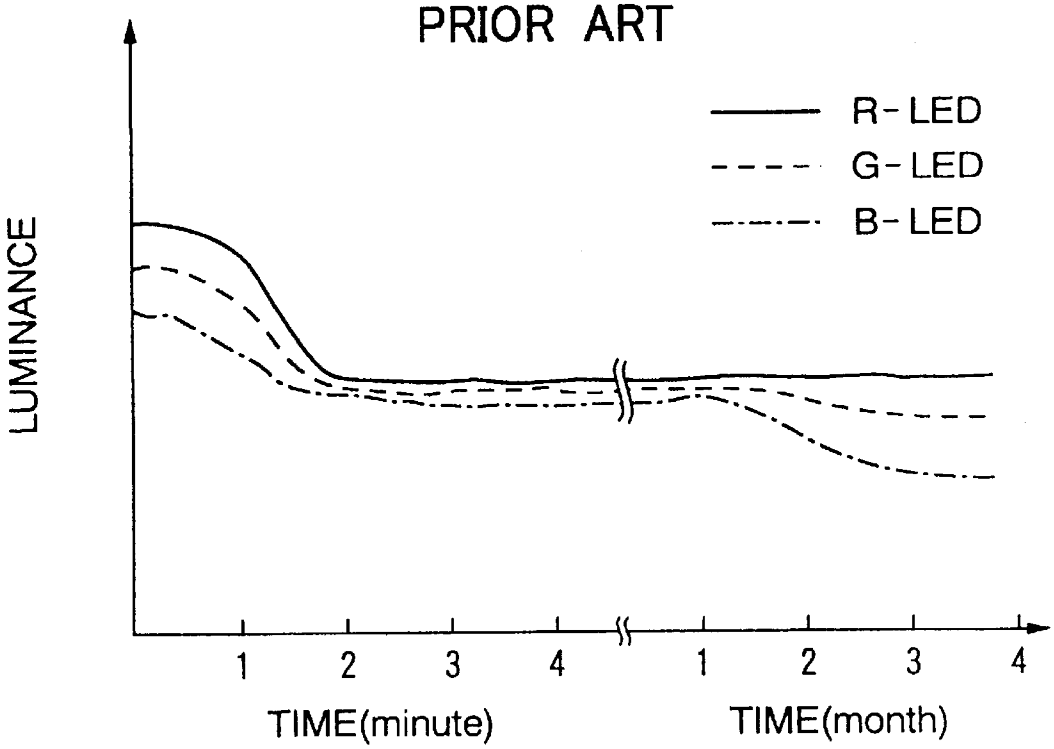
FIG. 17 PRIOR ART
FIG. 17 is a graph showing the variation of the luminance with time.

FIG. 4 is a graph showing variations of the luminances of LEDs 2*a*, 2*b* and 2*c* in the case where the light quantity controlling circuit according to the present invention is used. According to the graph, the luminance variation caused by heating of LED is not recognized. The luminance is kept constant, and the characteristics are remarkably improved compared with the graphs shown in FIGS. 16 and 17. FIG. 4 is a graph showing the white balance state. Since the current flowing through each LED can be arbitrarily set by regulating variable resistor VR2, a desired white balance can be easily realized. For example, the white balance having a reddish tinge by slightly increasing the current flowing in the red LED 2*a*, or having a bluish tinge by slightly increasing the current flowing in the blue LED 2*c*.

Figure 5:
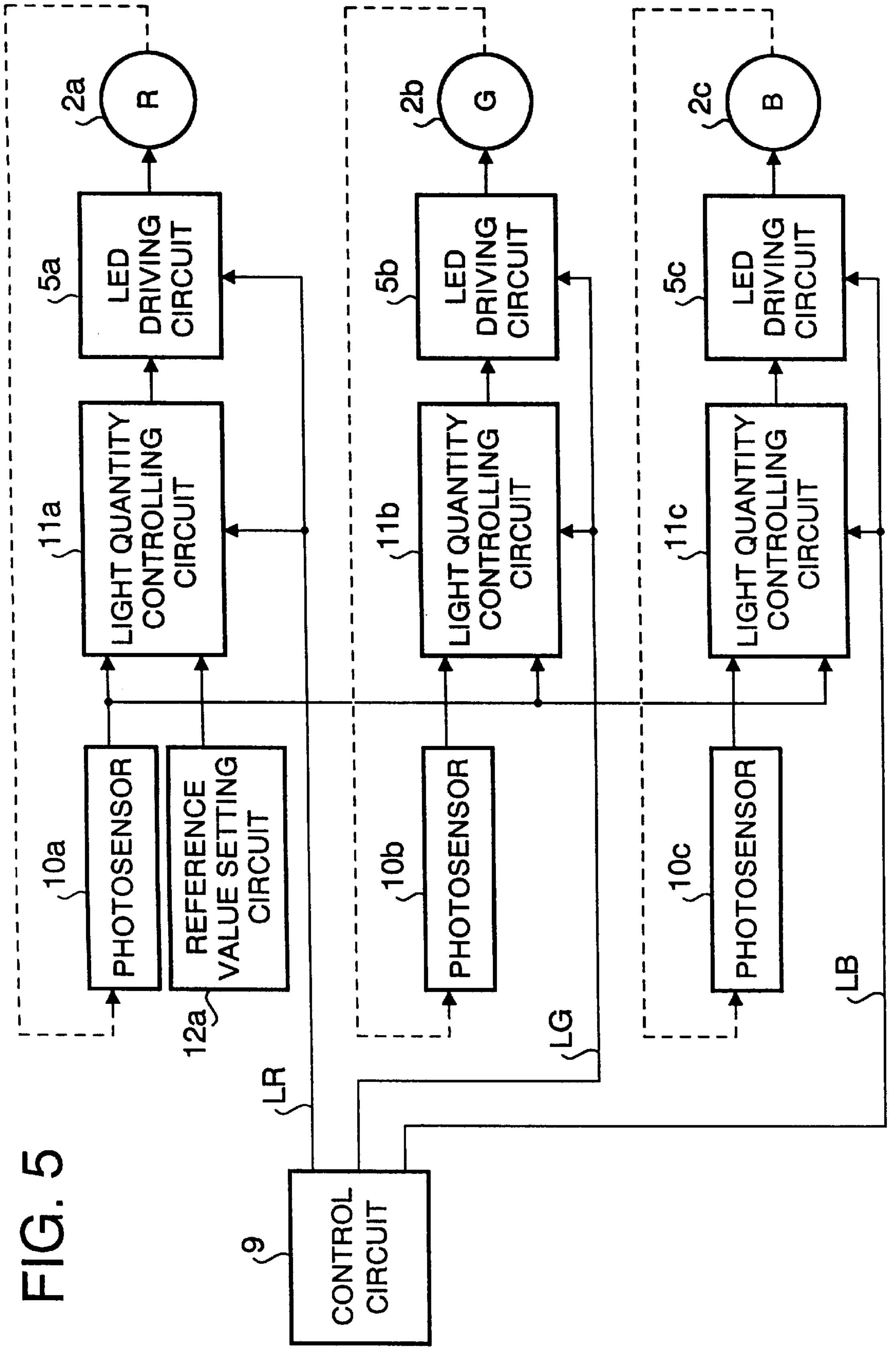
FIG. 5 is a block diagram showing flows of signals of a sequential color display device of another embodiment of the present invention.
Figure 6:
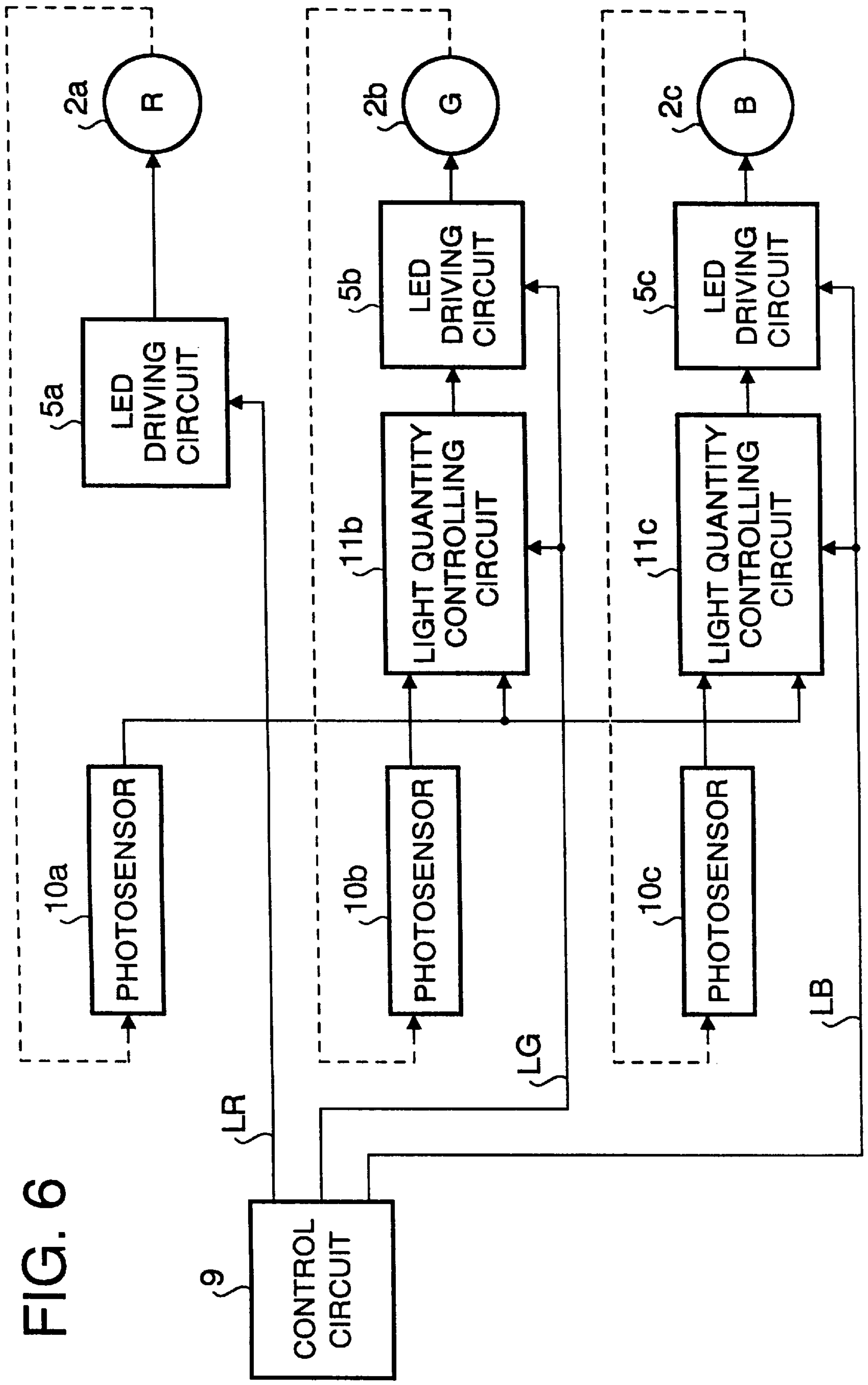
FIG. 6 is a block diagram showing flows of signals of a sequential color display device of a further embodiment of the present invention.
Figure 7:
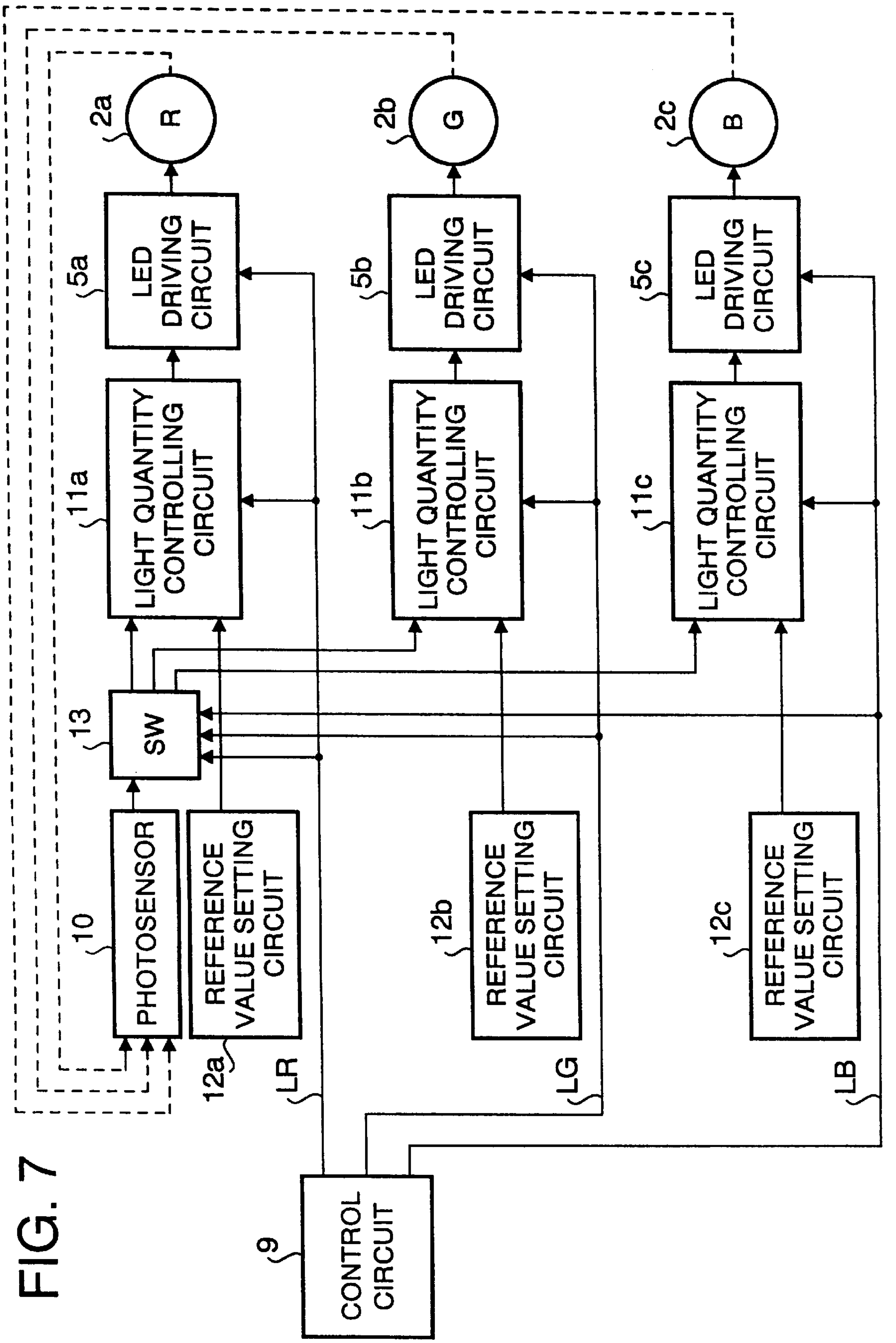
FIG. 7 is a block diagram showing flows of signals of a sequential color display device of a still further embodiment of the present invention.

FIGS. 5 to 7 are block diagrams showing other embodiments of the present invention.

In the embodiment shown in FIG. 5, the reference value setting circuit 12*a* is provided only for the red color circuit. The reference value set by the reference value setting circuit 12*a* is used also as the reference value for the green and blue color circuits. Each of luminances detected by the photosensors 10*a*, 10*b* and 10*c* provided adjacent the LEDs 2*a*, 2*b* and 2*c* is compared with the reference value set by the reference value setting circuit 12*a*. Since the structure of this embodiment is simple, it is very useful means if there is not a large difference in luminances of LEDs 2*a*, 2*b* and 2*c*.

In the embodiment shown in FIG. 6, there is not provided a specific reference value. The luminance of the red color LED 2*a* is used as a reference level for green and blue color circuits in order to control the luminances. That is, the luminance of the red LED 2*a* detected by the photosensor 10*a* is inputted as a reference value for the green and blue light quantity controlling circuits 11*b* and 11*c*, respectively. Each of the luminances detected by the photosensors 10*b* and 10*c* is compared with the luminance of the LED 2*a* detected by the photosensor 10*a* and controlled thereby.

FIG. 7 is a block diagram showing an embodiment comprising a single photosensor 10. A switching device 13 is connected to the single photosensor 10. The emitted light from LEDs 2*a*, 2*b* and 2*c* are sequentially received by the single photosensor 10. The detected luminances are switched by the switching device 13 and fed to respective light quantity controlling circuits 11*a*, 11*b* and 11*c*, and compared with respective reference values in the reference value setting circuits 12*a*, 12*b* and 12*c*.

Figure 8:
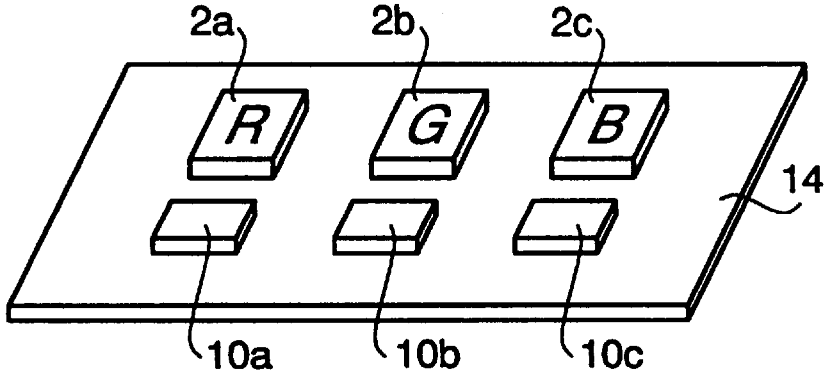
FIG. 8 is a perspective view showing color light sources.

FIGS. 8 to 13 show practical mounting methods of photosensors. FIG. 8 is a perspective view of a first mounting method of photosensors. The photosensors 10*a*, 10*b* and 10*c* corresponding to respective LEDs 2*a*, 2*b* and 2*c* are mounted adjacent the LEDs on a back light plate 14. This is a most standard mounting method in the case where there is a sufficient space for mounting the photosensors on the back light plate 14.

Figure 9:
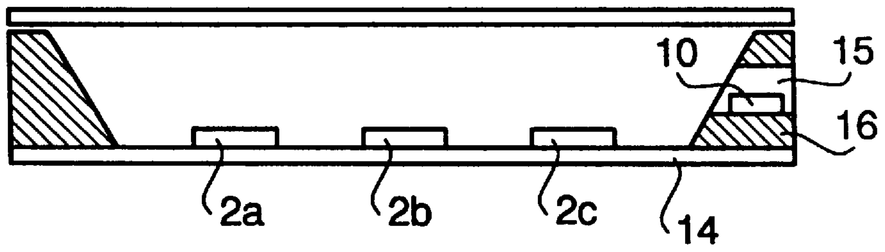
FIG. 9 is a sectional view showing color light sources.

FIG. 9 is a sectional view of the light sources of a second mounting method of the photosensors. On the back light plate, there are provided only LEDs 2*a*, 2*b* and 2*c*, and the photosensor 10 is mounted in a hole 15 formed in a reflecting frame 16 provided on the back light plate 14. This is a mounting method in the case where there is no area sufficient for mounting the photosensors on the back light plate 14. Since the photosensor 10 is mounted in the hole, the photosensor does not obstruct the light toward the shutter 6.

Figure 10:
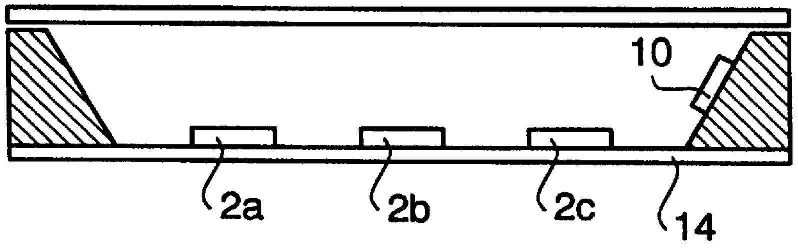
FIG. 10 is a sectional view showing color light sources.

FIG. 10 is a sectional view showing a third mounting method of the photosensors. The photosensor 10 is mounted on the surface of the reflecting frame 16.

Figure 11:
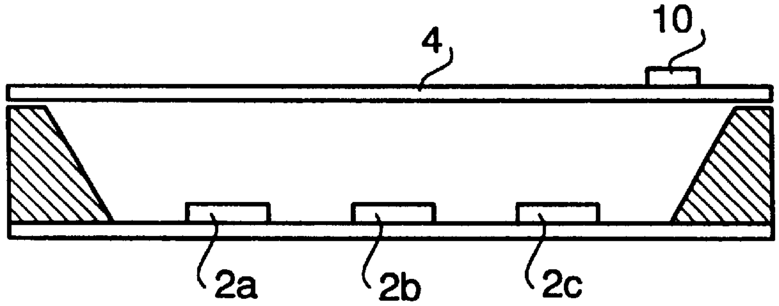
FIGS. 11 to 13 are sectional views showing color light sources, respectively.

FIG. 11 is a sectional view showing a fourth mounting method of the photosensors. The photosensor 10 is mounted on the surface of the light diffusion plate 4. Since the photosensor 10 is mounted on a peripheral portion of the light diffusion plate 4, the photosensor does not obstruct the light to the shutter.

Figure 12:
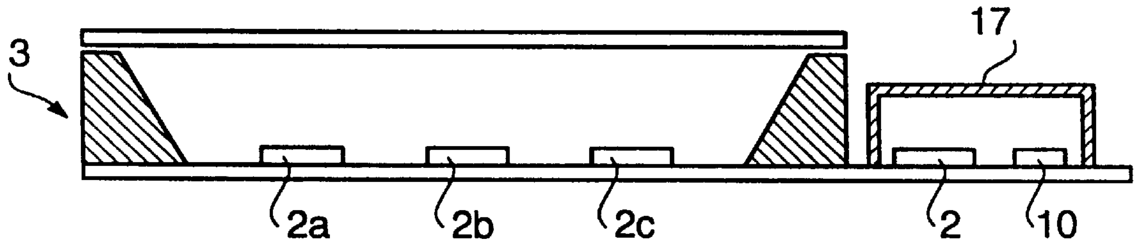

FIG. 12 is a sectional view of a fifth mounting method of photosensors. Outside the LED box 3, a photocoupler 17 is mounted on the back light plate 14. In the photocoupler, the photosensor 10 and an LED 2 having the same characteristics as one of the LEDs 2*a*, 2*b* and 2*c* are contained.

Figure 13:
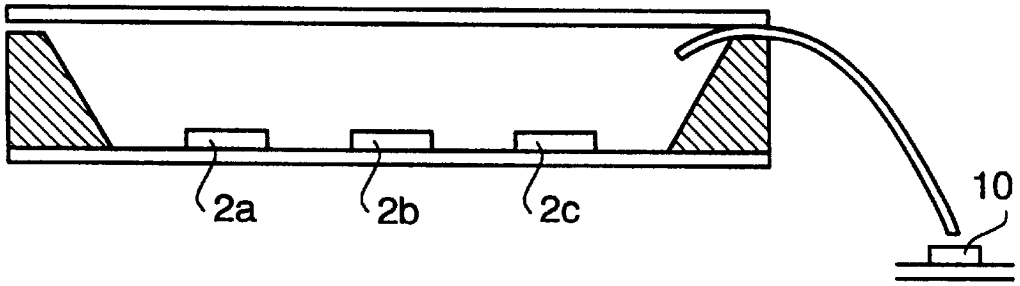
Figure 14:
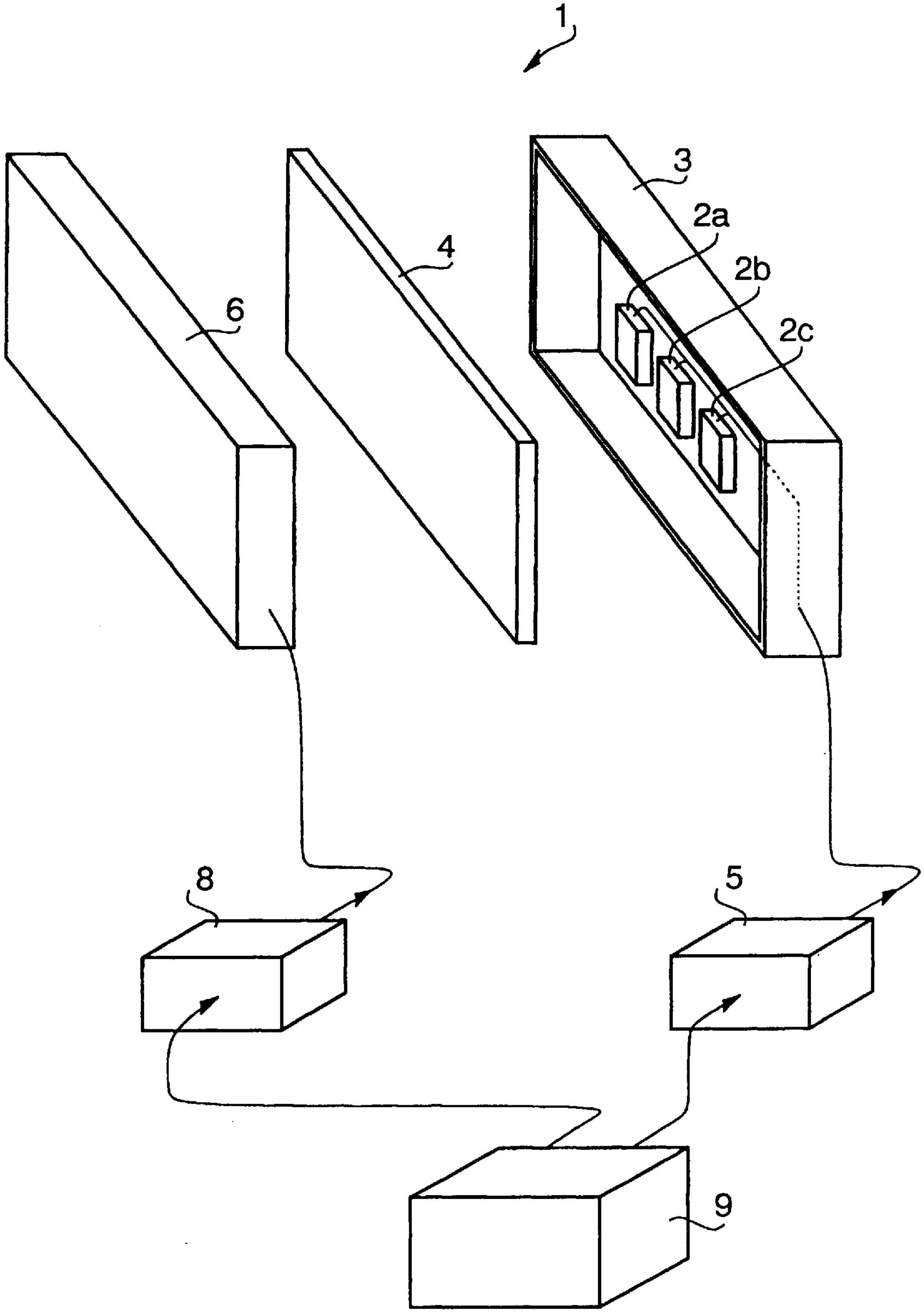
FIG. 14 PRIOR ART
FIG. 14 is a perspective view showing constitution of a sequential color display device.

FIG. 13 is a sectional view of a sixth mounting method of photosensors. In an arbitrary place outside the LED box, the photosensor 10 is provided, and the photosensor 10 is optically connected to the LEDs 2*a*, 2*b* and 2*c* by light fibers.

As described above, according to the present invention, in spite of the variation in temperature of the light source, it is possible to keep the white balance.

While the invention has been described in conjunction with preferred specific embodiment thereof, it will be understood that this description is intended to illustrate and not limit the scope of the invention, which is defined by the following claims.

What is claimed is:

1. A sequential color display device comprising:

a plurality of light sources, each emitting different color light from other light sources;

a shutter for sequentially passing color light beams from the light sources;

at least one photosensor for detecting luminance of each of the light sources;

a controller for sequentially operating each of the light sources, the shutter, and the photosensor in synchronism with each other at regular intervals; and luminance control means responsive to a luminance detected by the photosensor for controlling the luminance of each of the light sources so as to keep a color balance of the light emitted from the color display device.

2. The display device according to claim 1 wherein the color balance is the white balance.

3. The display device according to claim 1 wherein the light sources are light emitting diodes.

4. The display device according to claim 1 wherein the shutter is a liquid crystal shutter.

5. The display device according to claim 1 wherein the photosensor is a photodiode.

6. The display device according to claim 1 wherein the controller is provided for sequentially producing operating signals for applying the output of the photosensor to the luminance control means.

7. The display device according to claim 1 wherein the luminance control means comprises a subtracter for comparing an input signal dependent on the detected luminance with a reference value and producing an output signal based on the comparison.

8. The display device according to claim 7 wherein the luminance control means has a driving circuit responsive to the output signal of the subtracter for controlling a current passing each of the light sources so as to keep the color balance.

9. The display device according to claim 7 wherein the luminance control means has an integrating circuit for integrating an input signal dependent on the output of the photosensor, and a Zener diode for applying the output of the integrating circuit to the subtracter when exceeding the breakdown voltage thereof.

10. The display device according to claim 7 wherein the reference value is set to such a value that each of the light sources produces light of a maximum luminance.

11. The display device according to claim 7 wherein the reference value is a reference voltage set by a reference value setting circuit.

12. The display device according to claim 7 wherein the reference value is a reference voltage dependent on a luminance of one of the light sources.

* * * * *